T. S. PHILLIPS,
Assignor, by mesne assignments, to THE S. S. WHITE DENTAL MANUFACTURING COMPANY.
HAND PIECE FOR DENTAL ENGINES.
No. 10,115. Reissued May 16, 1882.
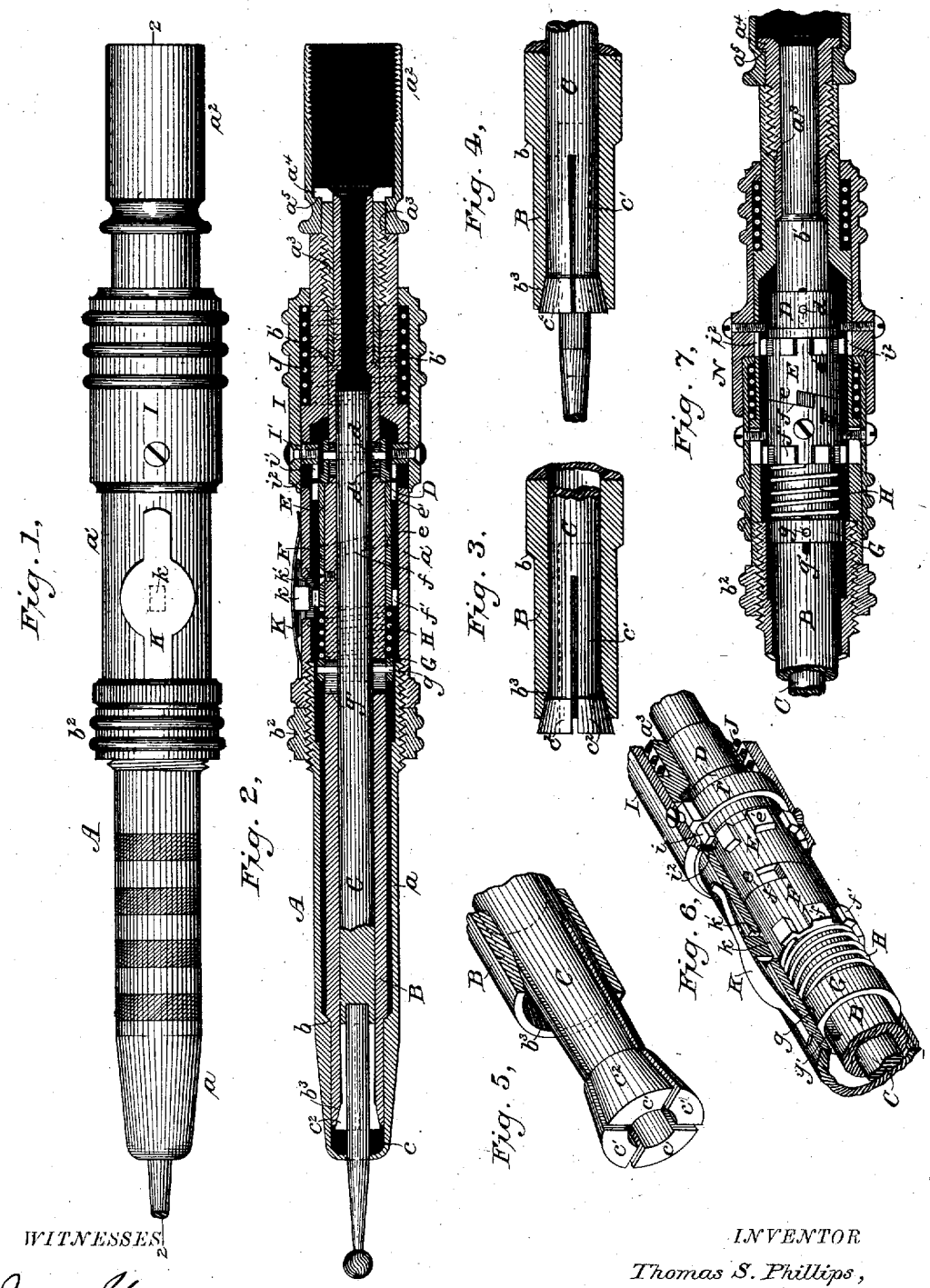
WITNESSES
James Young
Geo W Brick
INVENTOR
Thomas S. Phillips,
By his Attorneys
Baldwin, Hopkins & Peyton.
N. PETERS, Photo-Lithographer, Washington, D. C.

UNITED STATES PATENT OFFICE.

THOMAS S. PHILLIPS, OF BUFFALO, NEW YORK, ASSIGNOR, BY MESNE ASSIGNMENTS, TO THE S. S. WHITE DENTAL MANUFACTURING COMPANY, OF PHILADELPHIA, PENNSYLVANIA.

HAND-PIECE FOR DENTAL ENGINES.

SPECIFICATION forming part of Reissued Letters Patent No. 10,115, dated May 16, 1882.

Original No. 219,873, dated September 23, 1879. Application for reissue filed January 11, 1882.

*To all whom it may concern:*

Be it known that I, THOMAS S. PHILLIPS, of the city of Buffalo, county of Erie, and State of New York, have invented certain new and useful Improvements in Hand-Pieces for Dental Engines, of which the following is a specification.

The first part of my invention relates to a hand-piece for carrying a drill, burr, or other rotating tool used in operations upon the teeth, in which the tool is held and driven by lateral pressure upon its sides.

The object of this part of my invention is to produce a hand-piece of the above description in which the tool is held by a tool-holder interposed between the tool and a tubular spindle or shaft fitted to turn in the hand-piece casing, thus allowing the tool to be fastened or released without change of diameter or position of the spindle.

This part of my invention consists in the combination of a hollow spindle fitted to turn in an inclosing casing, a gripping tool-holder contained within said spindle, and a cam or cams which give a slight longitudinal motion to the tool-holder.

My invention also consists in the combination of a hollow spindle fitted to rotate in bearings in an inclosing casing, a gripping tool-holder contained within said spindle, a cam to give said tool-holder a slight longitudinal motion in one direction, and a spring to move said holder in the opposite direction.

My invention also consists in the combination of a casing having an opening in its side, a hollow spindle enveloped by said casing, a gripping tool-holder contained within said spindle, and a sleeve mounted externally upon the casing to move said tool-holder endwise in the spindle.

My invention also consists in the combination of a casing, a hollow spindle fitted to rotate in bearings in said casing, a gripping tool-holder contained in said spindle, and a detent mounted upon the casing and acting therethrough to prevent rotation of said spindle when the tool-holder is being operated.

The next part of my invention relates to the structure of the front end of the hand-piece; and this part of my said invention consists in so forming the nose-piece or front end of the hand-piece casing as to provide a chamber or space around the tool-shank as it emerges from the socket of its holder for the purpose of arresting the passage of saliva, grit, or other deleterious matter into the bearings of the casing or into the tool-socket, thus preventing unnecessary wear of the bearings or the rusting fast of the tool if it should be allowed to remain in the instrument after use, while the formation described also prevents the exudation of oil, &c., from the interior of the hand-piece casing to the exterior thereof.

In the accompanying drawings, Figure 1 is a view in elevation of my improved instrument. Fig. 2 is a longitudinal section therethrough on the line 2 2 of Fig. 1. Fig. 3 is a longitudinal section through the front end of the rotary spindle, showing the tool-holder as thrust forward to release the tool; and Fig. 4 is a similar view, showing the tool-holder as retracted to its locking position in the spindle. Fig. 5 is a perspective view, showing the longitudinal divisions or splits of the locking end of the tool-holder. Fig. 6 is a sectional perspective view of part of the spindle and actuating devices of the tool holder. Fig. 7 is a sectional view, showing a variation in the construction of the parts used to operate the cams from the outside of the casing.

The casing A of the hand-piece is shown as constructed of three tubular sections, $a$ $a'$ $a^2$. The two sections $a$ $a'$, which constitute the handle portion of the casing, are united by screwing the one into the other—that is to say, the front section, $a$, has male threads formed upon its inner end, so as to enter the female-threaded end of the intermediate section, $a'$, of the casing. (See Fig. 2.) Said casing-sections $a$ $a'$ surround the rotary spindle or shaft B and form a sheath for it. The front end of the said spindle has its bearing near the front end or nose of casing-section $a$, while the rear end of said spindle has its bearing in a tubular bushing, $a^3$, screwed into the intermediate casing-section, $a'$, so as to be removable therefrom. The spindle is provided at front and rear with annular shoulders or tapering enlargements $b$ $b'$, which abut against similar shoulders formed at front in the casing-section $a$ and at rear by the front face of the bushing $a^3$, whereby endwise movement of the spindle in the casing is prevented and the spindle caused to run true and firm without rattling or wabbling movements. As wear of the bearings and of the journals and shoulders of the spindle takes place the spindle commences to run unsteadily; but this is immediately remedied by adjusting the sections $a$ $a'$, by their screw-connections, so as to take up or compensate for all wear. In order to prevent accidental turning of one of said sections relatively to the other when adjusted, I employ a jam-nut, $b^2$, which works upon the threads of the casing-section $a$, as clearly shown in Figs. 1, 2, and 7.

From what has been said it will be seen that I have provided a ready means for taking up or compensating wear, and for bringing the thrust-face of the bushing $a^3$ against the thrust shoulder or enlargement $b'$ of the spindle, while I have also made arrangements by its screw-connection to readily withdraw the bushing (which receives the wear of the rear journal and protects its casing-section $a'$) when too much worn, and substitute a new one in place thereof, thus enabling the hand-piece as a whole to be continued in use for a long time. I utilize the said bushing $a^3$ as the connection between the casing-section $a'$ and the shank-section $a^2$ of the hand-piece, as clearly shown in Figs. 2 and 7. The externally-threaded bushing $a^3$ has an annular peripheral flange, $a^4$, at its rear end, while the shank-section $a^2$ has an annular inwardly-projecting flange, $a^5$, at its front end, so that by passing the bushing through the shank-section up to the point where the two flanges $a^4$ $a^5$ prevent further endwise movement by coming together, and then screwing the bushing into its casing-section, a secure connection is formed, which is a swivel-connection—that is to say, the connection is such that the handle portion of the casing (sections $a$ $a'$) may turn relatively to the shank-section $a^2$ of the casing, so as to conform to the turning movements of the hand of the operator in manipulating the instrument.

In advance of the front journal of the spindle B it will be seen that the bore of the nose or front section of the casing is contracted to nearly the size of the cylindrical shank of the operating-tool, so that it will nearly touch but not quite bear upon it. By this construction a chamber, $c$, is formed at the front of the hand-piece in advance of the rotary spindle, the object of which is to arrest the passage of saliva, grit, or other injurious matter into the instrument, and to prevent the exudation of oil, &c., from the interior of the casing to the exterior thereof, which would soil the hands of the operator and face of the patient being operated upon.

The spindle B is a hollow or tubular spindle, and is intended to be revolved in its bearings in the inclosing casing at a high rate of speed, so that the tool carried by it may rapidly do its work.

To firmly secure any round or cylindrical tool-shank of the usual size in the rotary spindle of a practicable and desirable hand-piece, and enable the operating-tools to be freely and quickly interchanged, so as to permit the operator to work with tools having points or ends of different formation, is one of the prime if not the main object of my invention.

Heretofore, as far as I am aware, in all desirable hand-pieces, it has been the custom to employ a locking device capable of engaging and locking in the socket of the rotary spindle only a peculiarly notched or recessed tool-shank, so that in most cases only the tools having shanks adapted to the peculiar locking device could be used with the respective hand-pieces and not all cylindrical dental tool-shanks of the usual size. The result is that the tools of one maker cannot be used without alteration in the hand-piece of another maker, and this objection on the part of the dentist (who is the user of the instrument) in some cases is a serious one. For example, the dentist may find that the hand-piece he is using with his engine is a defective one as compared with the hand-piece of another maker; but if he changes hand-pieces he finds himself compelled either to buy a new set of operating-tools, which are costly, or to have the shanks of the old set altered to fit them to the new hand-piece. As a matter of fact, the tools, with but few exceptions, have round or cylindrical shanks of the same size. In order, therefore, to secure any round or cylindrical dental tool shank of the proper and usual size, whether notched or plain, firmly in the rotary spindle in operation, while enabling the tools to be readily secured in and released from said spindle at will, and this without changing the relation of the bearings or position of the spindle in the casing, I insert within said spindle what is known as a "gripping tool-holder," which is a socketed tool-holder having its locking end split longitudinally or otherwise so formed that its members or jaws may expand or contract, so as when contracted to grip or grasp the shank firmly by lateral pressure upon its sides, and when expanded to move laterally outward, releasing the tool-shank from its grip and enabling it to be removed from the socket.

It may be proper here to state that I do not claim to be the first to produce a hand-piece adapted to receive any round or cylindrical dental tool-shank of the usual and proper size. Such a hand-piece is shown in Requa's patent of 1878. Requa's hand-piece, as is stated hereinafter, however, is defective in some important particulars.

The socketed tool-holder C is split longitudinally at its front end, so as to form three or four members or jaws, $c'$, preferably, the tendency of which is to spring apart, as shown clearly in Figs. 3 and 5. The said members at their ends terminate so as to form a tapering head or enlargement, $c^2$, which is adapted to fit a corresponding seat, $b^3$, in the mouth of the spindle, whereby when said tapering end of the tool-holder is drawn into its seat in the spindle the members or jaws of the tool-holder will be positively contracted, and if a tool-shank has been inserted in the socket it will be firmly grasped and be compelled to rotate with the spindle. By moving said tool-holder slightly forward its tapering head $c^2$ is carried out of the recess in the spindle, and the members or jaws spring apart to release the tool.

In order to give the gripping tool-holder its longitudinal or endwise movements in the spindle, I employ the following arrangement: The shank of the holder is extended backward nearly to the rear end of the spindle, and is connected with a ring, D, fitted externally upon the spindle, so as to move back and forth, the connection being formed by a transverse pin, *d*, which is permitted to move with the ring D to carry the tool-holder by the formation of the longitudinal slots $d'$ in the spindle. (Clearly shown in Figs. 2 and 7.) The front annular edge of the ring D bears against the corresponding rear edge of a sleeve, E, which is fitted nicely upon the spindle, and is capable of turning thereon. The front edge, *e*, of this sleeve is a tapering or cam surface, as clearly shown in Figs. 2, 6, and 7, and said cam-surface acts upon a corresponding cam edge or surface, *f*, of a sleeve, F, surrounding the spindle and firmly fastened thereto, so as to be a part or fixture thereof. In advance of said sleeve F is a sliding ring, G, firmly connected with the tool-holder by a transverse pin, *g*, that works back and forth with the ring G in longitudinal slots $g'$ in the spindle. Interposed between the fixed cam-sleeve F of the spindle and the sliding ring G is a coiled spring, H, the tendency of which is to move or throw the ring G forward, so as to carry with it the tool-holder and protrude the locking end of said holder slightly beyond the end of the spindle to permit the locking-members thereof to expand. Both the turning cam-sleeve E and the fixed cam-sleeve F have radial teeth or projections, respectively designated by $e'$ $f'$. (See Figs. 2, 6, and 7.)

Surrounding the casing is a sleeve, I, fitted to slide back and forth, and near the front end of this sleeve is fitted an internal ring, I′, the sleeve and ring being firmly united. Projecting from the front face of said ring I′ are projections *i*, (two in number preferably,) which, when the sleeve I is moved forward, engage the projections $e'$ upon the turning cam-sleeve E, so as to partially turn said cam-sleeve when the sleeve I is turned upon the casing, which operation is permitted to a slight extent, owing to large square slots $i^2$ cut in the casing, by which slots the ring I is permitted not only to slide back and forth, but to partially turn to turn the cam-sleeve E, as aforesaid. Inclosed within the said external sleeve I, surrounding the casing, and compressed between an annular shoulder of said casing and an internal shoulder or flange of said sleeve, is a spiral spring, J, the tendency of which is to keep the said sleeve I, in its backward position with the projections of the ring I′, out of engagement with the cam-sleeve E, so as to offer no obstruction to the free revolution of the spindle; also, mounted upon the outside of the casing is a plate-spring, K, carrying a tooth or spur, *k*, which works through an opening, $k'$, in the casing, so that when the spring K is depressed said spur will engage the projections $f'$ of the fixed cam-sleeve F, and thus prevent the rotation of said cam and the spindle which carries it. When the pressure upon the spring K is relieved the spur rises out of engagement with the cam-sleeve F, so as to afford no obstruction to the free revolution of the spindle.

The operation of the tool-holder is as follows: Suppose the tool-holder to be in its advanced or unlocking position with its gripping members distended. A tool-shank is now inserted, as shown in Fig. 2, the spring K is depressed to lock the spindle from rotation, and the external sleeve, I, is moved forward, engaging its projections with those of the turning cam-sleeve E. A partial turn of said external sleeve in the right direction is now given, so as to turn the cam-sleeve E and make its cam-surface ride outward upon the cam-surface of the fixed sleeve F, the result of which is that the said cam-sleeve E is forced backward, carrying with it the ring D, and consequently the tool-holder connected with said ring, thereby firmly drawing the tapering head of the tool-holder into its seat in the spindle and compressing its jaws or members firmly upon the shank, locking it securely in the socket as against either independent turning or endwise movements. The external sleeve is now released, and is thrown automatically backward by its coiled spring. The spindle is now free to be rotated to drive the operating-tool. To release said tool from the socket the spring K is again depressed to hold the spindle stationary, the external sleeve, I, is again moved forward to engage the cam-sleeve E, and the said sleeve I is again partially turned, but this time in the reverse of the previous direction. This permits the cam-sleeve E, the ring D, and the tool-holder C to move forward under the action of the spring H, acting upon the tool-holder through the medium of the ring G, the result of the action of which spring H is that the tapering head of said tool-holder is thrust forward out of the mouth of the spindle and allowed to expand, thus releasing the tool-shank from its grip and permitting it to be withdrawn.

In Fig. 7 of the drawings I have shown a modification of the means for operating the cam E, which controls the action of the tool-holder. A sleeve, N, having a longitudinal motion only, is used instead of the spring K, said sleeve being loosely connected with the external sleeve, I, so that the two sleeves will move longitudinally together, while the sleeve I alone is capable of partial rotation to turn the cam, the spindle being held stationary by the sleeve N.

From what has been said I believe that my invention will be fully understood and appreciated.

It may be well, before reciting what I claim as my invention, to say that gripping split or spring-jawed tool-locks are very common in the art, and have been applied in several ways in the organization of dental-engine hand-pieces, but so far as I am aware without the desired practical success. Examples may be found in the patents of Stow, 1874, Edson and Evans, 1875, and Requa, 1878. In Stow's hand-piece the tendency of the spring-jaws to close in connection with a wedge-end tool is alone relied upon, and is objectionable for obvious reasons, one of which has been before stated. In Edson's and Evans's hand-piece the tool-holder projects beyond the nose of the casing, while the clamp-ring revolving outside the casing is liable to do injury to the patient—two objections fatal to its practical and successful use. Other objections might be mentioned. In Requa's hand-piece the front end of the spindle, which constitutes the front bearing thereof, is split to form the tool-holding or gripping jaws. This is a fatal objection. If the journal of the spindle is at its end, where the split socket must of necessity be formed, it is evident that the expansion and contraction of the members or jaws of the holder in releasing and securing a tool will cause a variation in the diameter of the journal, and will preclude and render impossible a close fit of the journal in its bearing, which close fit is absolutely essential to the performance of delicate work with the operating-tool, as the tool must run steadily and truly without wabbling or lateral movement. The Requa tool cannot be held closely to its work and carried steadily unless it is made to fit closely in the nose or front section of the hand-piece casing and act as the front bearing of the spindle, and it has always been found that a great deal of wear will take place at this point between the nose-piece and tool. Moreover, as the splits made in forming the gripping tool-holder extend from the journal-surface of the socket it will be seen that the shank of the tool contained therein will become smeared with the dirty oil from the bearing, and unless extreme care is used this oil will exude around the tool and soil the face of the patient. This latter objection may be avoided by the application of the cap and packing described and shown in the patent of Swallow, No. 185,651, of December 26, 1876; but in this case a certain amount of friction will be induced by the pressure of the gasket upon the tool; and if it be made of soft vulcanized rubber, as is usually the case, it will be eventually softened and destroyed by the action of the oil upon it, and will then need replacement.

By my invention the objections noted have been overcome. I have produced a hand-piece in which the spindle is closely fitted in its bearings irrespective of the holding or releasing of the tool, which is retained by a device distinct from the spindle, while capable of receiving and securing round-shanked tools irrespective of peculiar notches or construction. The exudation of oil and the entrance of deleterious substances to the bearings are also prevented by the peculiar construction of the nose-piece or front casing-section, without causing extra friction or necessitating renewal of the parts.

I claim as my invention—

1. The combination, substantially as herein-before set forth, of the hollow spindle fitted to turn in an inclosing-casing, the gripping tool-holder contained within said spindle, and cam mechanism to give a longitudinal motion to the tool-holder.

2. The combination, substantially as herein-before set forth, of the hollow spindle fitted to rotate in bearings in an inclosing casing, a gripping tool-holder contained within said spindle, cam mechanism to give said tool-holder a slight longitudinal motion in one direction, and a spring to move said holder in the opposite direction.

3. The combination, substantially as herein-before set forth, of a tubular casing having an opening in its side, a hollow spindle enveloped by said casing, a gripping or split tool-holder contained within said spindle, and a turning sleeve mounted externally upon the casing to move said tool-holder endwise in the spindle through intermediate connections, substantially as described.

4. A hand-piece having a chamber at the nose or front end thereof, said chamber being formed by the extension of the front section of the casing or nose-piece beyond the end of the tool-carrying spindle and its approach to without bearing upon the tool, substantially as described.

5. The combination, substantially as herein-before set forth, of the casing, the hollow spindle fitted to rotate in bearings in said casing, the gripping tool-holder contained in said spindle, and a detent mounted upon the casing and acting therethrough to prevent rotation of said spindle when the tool-holder is being operated.

In testimony whereof I have hereunto subscribed my name.

THOMAS S. PHILLIPS.

Witnesses:
MARTIN CLARK,
LOUIS BRAUNLIEN.